Patented Oct. 20, 1936

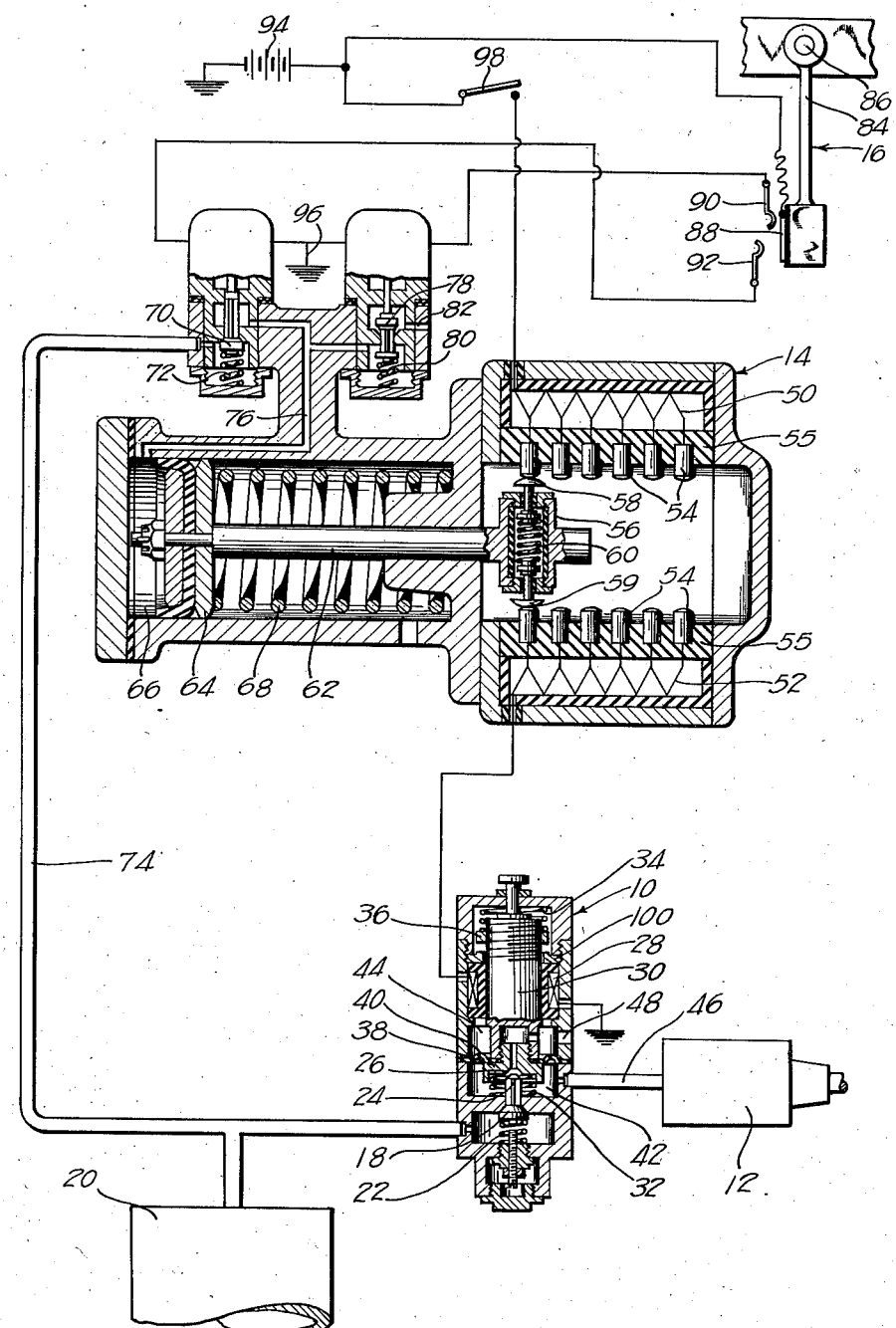

2,058,015

UNITED STATES PATENT OFFICE 2,058,015

BRAKE RETARDATION CONTROLLER

Ellis E. Hewitt, Edgewood, Pa., assignor to The Westinghouse Air Brake Company, Wilmerding, Pa., a corporation of Pennsylvania Application November 3, 1934, Serial No. 751,339

7 Claims. (Cl. 303—24)

This invention relates to brake retardation controllers, and more particularly to brake retardation controllers for fluid pressure brake systems.

It is a well known fact that the coefficient of friction between the rubbing parts of a friction brake diminishes as the speed of the vehicle with which the brake is associated diminishes. Therefore when a vehicle equipped with friction brakes is traveling at a high rate of speed, if the brakes are applied with a maximum braking force then as the speed of the vehicle diminishes the braking force must be reduced or otherwise sliding of the vehicle wheels may result. Sliding wheels are objectionable in that the effective retarding force due to such wheels is reduced, and in that flat places may be worn on the wheels thereby rendering them unfit for regular service.

It has heretofore been proposed to provide means for automatically diminishing the braking force as the speed of the vehicle diminishes, in the form of a retardation controller device. This device functions to maintain a substantially constant rate of retardation, which rate is usually that which can be maintained under the existing track conditions without danger of wheel sliding. Therefore, as the speed of the vehicle diminishes, and the increasing coefficient of friction between rubbing parts of the brakes tends to increase the braking force, the retardation controller device functions to reduce the braking force, and the vehicle is thus caused to decelerate at a substantially constant rate, and sliding of the wheels is thereby prevented.

It is a principal object of my invention to provide a new and novel means for controlling the braking force in a fluid pressure brake system so as to substantially prevent sliding of the wheels.

In modern fluid pressure brake systems, as employed on high speed trains and traction vehicles, it is common practice to employ some form of self-lapping valve device which is operated to effect a supply of fluid under pressure to a brake cylinder, and to lap the supply, in accordance with a desired brake cylinder pressure as selected by manipulation of some control device. In systems heretofore proposed, a retardation controller device has been provided for controlling the supply from the self-lapping valve device to the brake cylinder, but according to my invention I propose to control the self-lapping valve device itself according to operation of the retardation controller device, and thereby provide a simple and unified control system for such fluid pressure brake systems.

It is therefore another object of my invention to provide a fluid pressure brake system employing a self-lapping valve device, and means operated according to the rate of retardation of the vehicle for controlling this self-lapping valve device.

Other and more specific objects of my invention will appear from the following description which I have illustrated in the attached drawing showing diagrammatically in a single figure an arrangement of apparatus comprising one form that my invention may take.

Referring now to this drawing, I provide a self-lapping magnet valve device 10 for controlling the supply of fluid under pressure to and its release from a brake cylinder 12.

For controlling operation of this self-lapping valve device 10 according to the rate of retardation of the vehicle, I provide a pneumatic rheostat device 14 and a retardation controller device 16.

The self-lapping magnet valve device 10 is provided with a supply valve 18, which controls the flow of fluid under pressure from a reservoir 20 to the brake cylinder 12. This supply valve is urged toward a seated position by a spring 22. The upper end of the stem of this supply valve is tapered to form a release valve 24, which is adapted to coact with a release valve seat 26, to control the release of fluid under pressure from the brake cylinder 12.

The upper part of the valve device casing comprises an electromagnet having a winding 28, which when energized is adapted to actuate a core member 30 downwardly. When the winding 28 is deenergized, the core member 30 is held in an upper or biased position by action of two springs 32 and 34.

The upper spring 34 acts downwardly upon a collar 36 threadably disposed on the core member 30, while the lower spring 32 acts upon a cup member 38 secured to the lower end of the core member. The cup member 38 is also secured to a flexible diaphragm 40 having a chamber 42 therebelow and a chamber 44 thereabove. The chamber 42 is connected to the brake cylinder 12 by a pipe 46, so that in the position of the parts as shown the brake cylinder is vented to the atmosphere past the unseated release valve 24 and through an exhaust port 48.

The pneumatic rheostat 14 is provided with two resistance units 50 and 52, each having taps therefrom connected to two groups of adjacently disposed contacts 54. The resistance units and contacts are suitably insulated by insulating material 55. A movable contact mechanism 56 is adapted to be moved between the two groups of contacts 54 to successively cut out portions of the resistance units 50 and 52, as is apparent from the arrangement shown in the drawing.

The movable contact mechanism 56 comprises an upper contact 58 and a lower contact 59 suitably insulated from a supporting housing and urged in opposite directions by a spring 60.

The movable contact mechanism 56 is carried by a piston stem 62 secured to a piston 64 subject on one side to pressure from a chamber 66 and on the other side to pressure from a spring 68. The spring 68 urges the piston 64 to the left to a biased position where the contact mechanism 56 is positioned to cut the resistance units 50 and 52 out of circuit. The piston 64 is actuated to the right by the supply of fluid under pressure to chamber 66.

The supply of fluid under pressure to the chamber 66 is controlled by a supply valve 70, which is urged toward seated position by a spring 72 and toward unseated position by action of an electromagnet in the upper part of the casing, which when energized actuates the valve downwardly. When the valve 70 is unseated, fluid under pressure flows from the reservoir 20 through pipe 74, past the unseated valve 70, and through passage 76 to the piston chamber 66.

When the valve 70 is seated, this supply is cut off and the piston 64 assumes a position corresponding to the equalization of pressures on either side thereof.

Fluid under pressure may be released from the chamber 66 by action of a release valve 78, which is urged toward unseated position by a spring 80 and toward seated position by action of another electromagnet in the upper part of the casing, which when energized actuates the release valve downwardly. When the supply valve 70 is seated and the release valve 78 unseated, fluid under pressure flows to the atmosphere past the unseated release valve 70 and through port 82.

The retardation controller device 16 may be of one of a large number of types and for that reason I have shown only in diagrammatic form a pendulum type having a pendulum 84, pivotally mounted at 86, and carrying a contact 88 secured thereto and insulated therefrom. Disposed in the path of movement of the pendulum 84 are two resiliently supported stationary contacts 90 and 92. These contacts are arranged so that the pendulum contact 88 engages the stationary contact 90 first and subsequently the stationary contact 92.

The movable contact 88 is connected to a source of current supply, as for example a battery 94, and stationary contact 90 is connected to the electromagnet controlling the release valve 78, while the stationary contact 92 is connected to the electromagnet controlling the supply valve 70. The other terminal of each of these electromagnets is connected to the battery 94 by way of a ground connection 96, the battery 94 being also grounded as indicated.

The retardation controller device is positioned on the vehicle so that the pendulum 84 is actuated to the left according to the rate of deceleration of the vehicle, the contact 90 being engaged at one rate of deceleration and the contact 92 being engaged at a slightly higher rate of deceleration.

The operation of this embodiment of my invention is as follows:

When the vehicle is running, the parts will be substantially in the positions as indicated in the drawing. When it is desired to effect an application of the brakes, a switch 98 is closed. Closing of this switch energizes the self-lapping magnet valve winding 28 from the battery 94 through the contacts of the pneumatic rheostat 14. Energization of the winding 28 causes the core member 30 to be actuated downwardly until the collar 36 engages a stop washer 100. This downward movement of the core member 30 causes seating of the release valve 24 and unseating of the supply valve 18. Fluid under pressure then flows from the reservoir 20 to the brake cylinder 12, to apply the brakes.

When the brake application is initiated in this manner, the winding 28 is energized to a maximum degree, and fluid pressure then starts to build up in the brake cylinder to a maximum degree. When the braking force thus produced is sufficient to cause a rate of retardation great enough to cause the retardation controller contact 88 to engage the stationary contact 90, then release valve 78 will be caused to be seated. If the rate of retardation should increase further so that contact 88 engages contact 92, supply valve 70 will be caused to be unseated. Fluid under pressure will then flow to piston chamber 66, and the piston 64 will actuate the contact mechanism 56 to the right.

Movement of this contact mechanism to the right cuts into the circuit portions of the two resistance units 50 and 52. Introduction of this resistance into the circuit diminishes the current in the winding 28, and the combined force of the spring 32 and the fluid pressure acting on the diaphragm 40 from chamber 42 actuates the core member 30 upwardly. When sufficient resistance has been cut into the circuit, the supply valve 18 will be seated and the release valve 24 unseated, so that fluid under pressure will be released from the brake cylinder to the atmosphere until the pressures above and below the diaphragm 40 equalize, at which time both valves 18 and 24 will be seated.

The release of pressure from the brake cylinder will diminish the braking force and consequently the rate of retardation. When the rate of retardation diminishes, contact 88 is caused to disengage from stationary contact 92 and the supply of fluid under pressure to the piston chamber 66 will be cut off. If the rate of retardation should diminish further, contact 88 disengages from contact 90, and release valve 78 will as a result be unseated. Fluid pressure in chamber 66 will then be released to the atmosphere, and the contact mechanism 56 will be moved toward the left to cut resistance out of the circuit to the winding 28.

Now as the speed of the vehicle diminishes due to application of the brakes, the coefficient of friction between the rubbing parts of the brakes will increase, so that the rate of retardation tends to constantly increase with diminishing vehicle speed. Therefore, the retardation controller device will in general function to hold contacts 88 and 90 in engagement and will operate to intermittently cause contact 88 to engage contact 92, so as to intermittently supply fluid under pressure to piston chamber 66 to progressively cut in portions of the resistance units 50 and 52. This will then effect an intermittent release of fluid pressure from the brake cylinder, so that the braking force will be automatically reduced as the speed of the vehicle reduces. As a result, the vehicle will be brought to a stop smoothly, and if the retardation controller device is set for a rate permitted by the existing track conditions, sliding of the wheels will be practically eliminated.

If the operator should desire to release the brakes at any time, switch 98 may be opened and winding 28 will then be deenergized and release valve 24 will be unseated. The brake cylinder will then be completely vented to the atmosphere.

While I have described in detail one form that my invention may take, it is to be understood that I do not desire to be limited to this particular embodiment or otherwise than by the spirit and scope of the appended claims.

Having now described my invention, what I claim as new and desire to secure by Letters Patent, is:

1. In a vehicle brake system, the combination with a brake cylinder, of a self-lapping magnet valve device for controlling the supply of fluid under pressure to and its release from said brake cylinder, a circuit for supplying current to operate said magnet valve device, a rheostat in said circuit, means for biasing said rheostat to a minimum position, a retardation controller device, and means governed by operation of said retardation controller device for operating said rheostat from said minimum position toward a maximum position.

2. In a vehicle brake system, in combination, a brake cylinder, an electrically operated valve device operable to effect a supply of fluid under pressure to said brake cylinder according to the degree of energization thereof, a circuit for supplying current to operate said valve device, a variable rheostat in said circuit, means for urging said rheostat to a position of minimum resistance, and means operated according to the rate of retardation produced by an application of the brakes for progressively operating said rheostat toward a position of maximum resistance whereby to diminish energization of said electrically operated valve device.

3. In a vehicle brake system, in combination, a brake cylinder, an electrically operated self-lapping valve device, a circuit for supplying current to operate said valve device, a rheostat in said circuit, spring means urging said rheostat to a biased position, a retardation controller device, pneumatic means for operating said rheostat from said biased position, and means controlled by said retardation controller device for effecting a supply of fluid under pressure to said pneumatic means.

4. In a vehicle brake system, in combination, a brake cylinder, an electrically operated valve device operable to control the supply of fluid under pressure to and its release from said brake cylinder, a circuit for supplying current to operate said valve device, a rheostat in said circuit, spring means for biasing said rheostat to a position of minimum resistance, fluid pressure means for overcoming said spring means to operate said rheostat, magnet valve means for effecting the supply of fluid under pressure to and its release from said fluid pressure means, and a retardation controller device for controlling operation of said magnet valve means.

5. In a vehicle brake system, in combination, a brake cylinder, an electrically operated valve device for controlling the supply of fluid under pressure to and its release from said brake cylinder, a circuit for supplying current to operate said valve device, a rheostat device in said circuit, means normally positioning said rheostat device to a biased position, fluid pressure means for operating said rheostat to operative positions, a retardation controller device having normally open contacts, and means for effecting a supply of fluid under pressure to said fluid pressure means when said contacts are closed and for releasing pressure from said fluid pressure means when said contacts are opened.

6. In a fluid pressure brake system, the combination with a brake cylinder, of a self-lapping valve device operable to establish a fluid pressure in said brake cylinder according to the degree of energization thereof, a circuit for supplying current to energize said valve device, a rheostat in said circuit, said rheostat having a movable contact urged to a biased position of low resistance and adapted to be actuated to other positions of high resistance, fluid pressure means for actuating said movable contact, a retardation controller device having two normally open contacts, a supply magnet valve device and a release magnet valve device for effecting the supply of fluid under pressure to and its release from said fluid pressure means, a circuit for connecting one of said normally open contacts to said release magnet valve device, and a second circuit for connecting the other of said normally open contacts to said supply magnet valve device.

7. In a fluid pressure brake system, the combination with a brake cylinder, of an electrically controlled valve device for controlling the supply of fluid under pressure to and its release from said brake cylinder, a circuit for supplying current to operate said valve device, a resistor in said circuit and having a movable contact adapted to be moved to vary the resistance of said resistor, resilient means urging said movable contact to a position of low resistance, fluid pressure means for overcoming said resilient means to urge said movable contact to a high resistance position, a retardation controller device having normally open contacts, means responsive to closing and opening of said contacts for effecting a supply of fluid under pressure to and its release from said fluid pressure means.

ELLIS E. HEWITT.